United States Patent [19]
Mogi

[11] 3,992,695
[45] Nov. 16, 1976

[54] APPARATUS FOR DETECTING THE FAULT OF INDICATING LAMPS

[75] Inventor: Takaaki Mogi, Fujisawa, Japan

[73] Assignee: Nissan Motor Company, Limited, Japan

[22] Filed: Nov. 11, 1974

[21] Appl. No.: 522,870

[30] Foreign Application Priority Data
Nov. 30, 1973  Japan.......................... 48-138033[U]

[52] U.S. Cl.................................. 340/60; 340/251; 315/82
[51] Int. Cl.².............................................. B60Q 1/00
[58] Field of Search ............ 340/52 R, 52 D, 52 F, 340/60, 225, 251, 411; 315/82, 83

[56] References Cited
UNITED STATES PATENTS

| | | |
|---|---|---|
| 3,514,751 | 5/1970 | Pascente.......................... 340/251 X |
| 3,566,401 | 7/1968 | Smith et al........................... 340/411 |
| 3,631,393 | 12/1971 | Bennett............................... 340/251 |
| 3,641,488 | 2/1972 | Mullin................................ 340/52 F |
| 3,671,955 | 6/1972 | Malekzadeh........................... 315/83 |

*Primary Examiner*—Alvin H. Waring
*Attorney, Agent, or Firm*—Robert E. Burns; Emmanuel J. Lobato; Bruce L. Adams

[57] ABSTRACT

In an indicating lamp circuit wherein a plurality of indicating lamps are each connected in series with a plurality of switches which respond to the operating condition of a motor car, each lamp is energized by a power source through a switch adapted to close only when an engine for driving the motor car stops. Upon energization faulty lamps are not illuminated so that their faulty condition is automatically detected when the engine is not in operation.

9 Claims, 4 Drawing Figures

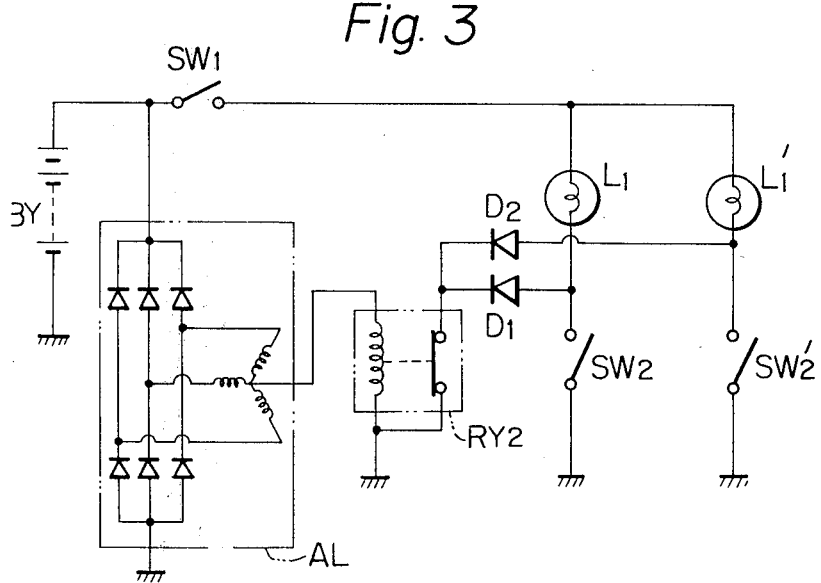
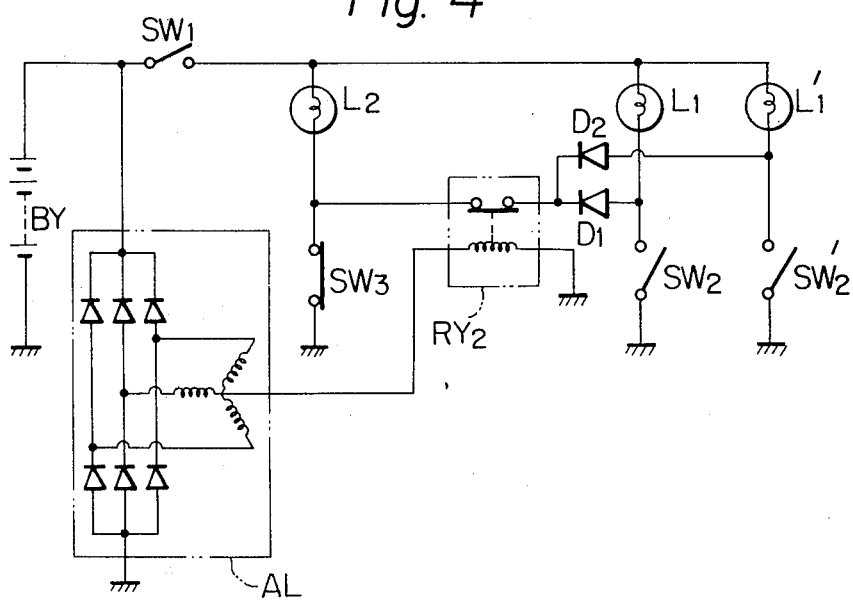

APPARATUS FOR DETECTING THE FAULT OF INDICATING LAMPS

BACKGROUND OF THE INVENTION

The present invention relates to apparatus for detecting fault of indicating lamps, especially those used in motor cars.

In a motor car a plurality of lamps are used to indicate the operating conditions of various portions, and faults such as the breakage of the filaments of the lamps should be supervised constantly.

Heretobefore, one or more check switches have been provided for merely checking indicating lamps so that it has been necessary to operate such check switches in order to detect that one of the lamps is faulty. Accordingly, it is more or less troublesome to operate check switches.

SUMMARY OF THE INVENTION

Accordingly, it is an object of the present invention to provide improved indicating lamp circuit for detecting faults in any one of a plurality of indicating lamps provided on a motor car, which is simple in construction but automatically detects faulty indicating lamps.

Another object of the present invention is to provide an improved indicating lamp circuit capable of detecting faulty indicating lamps while the motor car is not running but permitting the indicating lamps to display various operating conditions of the motor car when it is in operation.

Another object of the present invention is to provide a lamp indicating circuit in which the indicating lamps may be simultaneously tested to determine which lamps are fault-free and which are faulty.

According to the present invention there is provided an indicating lamp circuit for detecting the fault of a plurality of indicating lamps of a motor car or vehicle of the type comprising a plurality of switches responsive to various operating conditions of the motor car, a plurality of indicating lamps connected in series with respective switches, means for connecting terminals of the indicating lamps to one pole of an electrical source or supply, characterized in that there are provided a common conductor, switch means connected between the common conductor and the other pole of the source, said switch means being closed when an engine of the motor car stops its operation, and a plurality of diodes connected between the common conductor and the remaining terminals of the respective indicating lamps. The switch means, common conductor and diodes comprise means for automatically detecting faulty indicating lamps.

BRIEF DESCRIPTION OF THE DRAWINGS

In the accompanying drawings:

FIGS. 1 to 4 inclusive are circuit diagrams illustrating various embodiments of the present invention.

DESCRIPTION OF THE PREFERRED EMBODIMENTS

Figure 1:
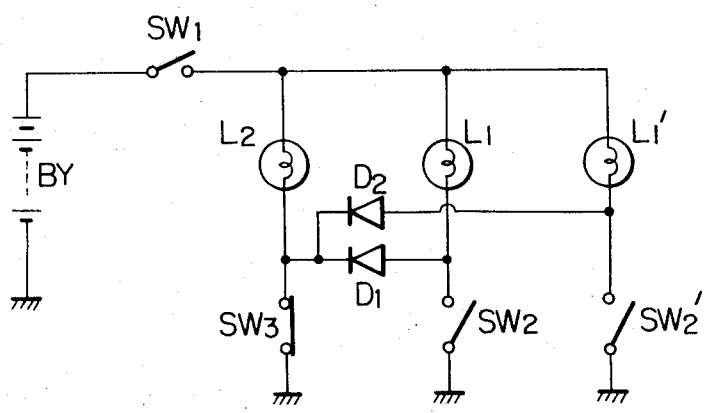

In the embodiment shown in FIG. 1, indicating lamps $L_1$ and $L'_1$ are connected in series with respective sensor switches such as $SW_2$ and $SW'_2$ and an ignition switch $SW_1$ is connected between one terminal of a battery BY and the indicating lamps $L_1$ and $L'_1$. The ignition switch $SW_2$ comprises means for applying the battery BY voltage to the series combinations of lamps and sensor switches. The other terminal of the battery and sensor switches $SW_2$ and $SW'_2$ are grounded. The electrical ground to which the battery and switches are connected constitutes means defining an electrically conductive path between the grounded battery terminal and the grounded switches. An oil pressure switch $SW_3$ and an oil pressure indicating lamp $L_2$ are connected in series across the battery BY through the ignition switch $SW_1$. Respective indicating lamps $L_1$ and $L'_1$ are connected by the diodes $D_1$, $D_2$ to the junction between the oil pressure switch $SW_3$ and the oil pressure indicating lamp $L_2$. The oil pressure switch $SW_3$ is opened while the engine of the motor car or vehicle is operating but is closed when the engine stops.

In operation, when the ignition switch $SW_1$ is closed and the engine is not operating, the oil pressure switch $SW_3$ is closed so that various indicating lamps $L_1$, $L'_1$ and $L_2$ are lighted through diodes $D_1$ and $D_2$ and the oil pressure switch $SW_3$. Accordingly, fault of any lamp can be detected at a glance because faulty lamps would not illuminated.

During operation of the engine, since the oil pressure switch $SW_3$ is opened, all indicating lamps will not be lighted until associated sensor switches $SW_2$, $SW'_2$ operate.

As described above, by providing a circuit including diodes between the oil pressure switch and indicating lamps it is possible to readily determine whether the indicating lamps are faulty or not while the engine is stopped. Thus, the oil pressure switch $SW_3$ also functions as a lamp-checking switch and is operable to simultaneously energize all of the lamps to indicate which lamps are fault-free.

Figure 2:
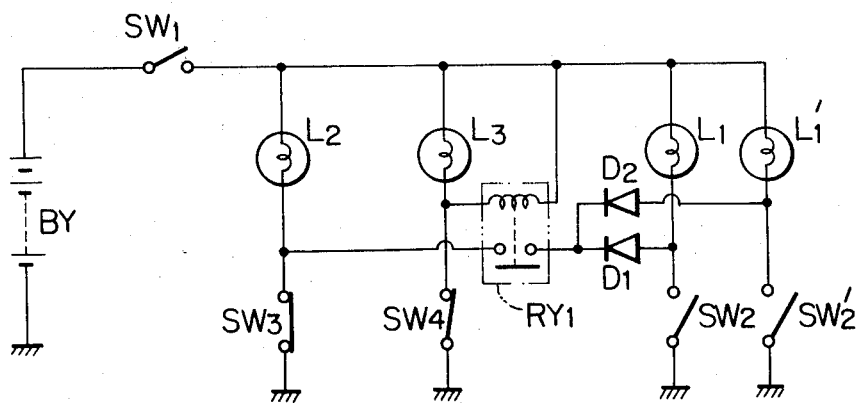

In the embodiment shown in FIG. 2, in the common grounding circuit for checking indicating lamps, that is, in the circuit including the diodes $D_1$ and $D_2$ is arranged a relay switch of a relay $RY_1$ which is closed when the charging lamp $L_3$ of a voltage regulator (not shown) is lighted. Namely, a switch $SW_4$ connected in series with the charging lamp $L_3$ of the voltage regulator is closed as long as the engine and hence the generator of the motor car is not operating and, accordingly, charging lamp $L_3$ is lighted when ignition switch $SW_1$ is closed. At the same time the relay $RY_1$ is also energized to close its switch. Since, accordingly, the oil pressure switch $SW_3$ is also closed when the engine is stopped, the grounding circuits for respective indicating lamps are estblished thus enabling a determination of faulty indicating lamps in the same manner as in FIG. 1.

When the engine is started the oil pressure switch is opened and the voltage of the generator builds up so that switch $SW_4$ associated with the voltage regulator of generator is opened. As a consequence relay $RY_1$ is de-energized to open the grounding circuit for the indicating lamps $L_1$ and $L'_1$.

With this embodiment even when either one of the oil pressure switch $SW_3$ or the charging lamp switch $SW_4$ is ON due to some condition during the operating of the engine any one of the indicating lamps $L_1$ and $L'_1$ will not be lighted but these lamps are lighted only when sensor switches $SW_2$ and $SW'_2$ associated therewith are operated. When both switches $SW_3$ and $SW_4$ are closed at the same time lamps $L_1$ and $L'_1$ will be lighted. It is, however, to be noted that simultaneous fault of both switches $SW_3$ and $SW_4$ hardly takes place.

In another modification shown in FIG. 3, the oil pressure switch $SW_3$ showin in FIG. 1 is substituted by a relay $RY_2$ responsive to the voltage of the neutral voltage mode of a polyphase alternating current generator AL which is used to charge the battery BY through a rectifier arrangement.

While the engine is not operating, the neutral voltage of the alternator AL is zero so that the contact of the normally closed relay $RY_2$ is actuated thus closing the grounding circuit for the indicating lamps $L_1$ and $L'_1$. However, when the engine is operated and as the neutral voltage is generated (the neutral) voltage is equal to about one half of the terminal voltage of the alternator) the relay switch of relay $RY_2$ is opened thus opening the grounding circuit for the indicating lamps $L_1$ and $L'_1$. Thus, this embodiment operates in the same manner as that shown in FIG. 1.

In still another embodiment of this invention shown in FIG. 4, the relay $RY_1$ shown in FIG. 2 is substituted by a relay $RY_2$ operated by the neutral voltage of a polyphase alternator AL. The operation of this embodiment is identical to that at the embodiment shown in FIG. 2.

According to this invention, any special operation for checking for faults of a plurality of indicating lamps is performed automatically at the time of starting the engine. After starting of engine a check circuit, that is, the grounding circuit, is interrupted automatically and respective indicating lamps are lighted in response to the closure of sensor switches associated therewith. Thus, the invention contributes greatly to the safe running of the motor car and make needless troublesome checking operations.

What is claimed is:

1. In a motor vehicle having an indicating lamp circuit of the type including a plurality of switches responsive to motor vehicle operating conditions; a plurality of indicating lamps each connected in series with a respective switch of said plurality of switches; an electrical power source having a pair of terminals; a vehicle ignition switch connected between one terminal of said power source and each of said indicating lamps; means defining an electrically conductive path between the other terminal of said power source and each of said switches; and means for automatically simultaneously energizing said indicating lamps to permit detection of faulty indicating lamps wherein said means for simultaneously energizing said indicating lamps comprises:

a normally closed switch responsive to the motor oil pressure and opened when the motor oil pressure exceeds a certain value, said normally closed switch connected in parallel with each series combination of said switches with the respective ones of said indicating lamps; and a plurality of diodes each connected between the junction of a respective one of said switches with its respective indicating lamp and said normally closed switch, said diodes having a polarity effective to complete a conductive circuit path between the terminals of said power source defined by said ignition switch, said indicating lamps, said diodes, said normally closed switch, and said means defining an electrically conductive path;

whereby said indicating lamps are automatically simultaneously energized and fault-free ones of said indicating lamps are illuminated to indicate their fault-free condition when said ignition switch is closed and the vehicle motor oil pressure is less than the certain value.

2. In a motor vehicle having an indicating lamp circuit according to claim 1, further comprises an oil pressure indicating lamp connected in series between said vehicle ignition switch and said normally closed switch, and wherein said diodes are connected to said normally closed switch at the connection of said normally closed switch with said oil pressure indicating lamp.

3. In a motor vehicle having an indicating lamp circuit according to claim 2, further comprising a relay comprised of a coil and a normally open switch actuated to close upon energization of said coil, and wherein one of said plurality of switches is responsive to a charging voltage developed by a vehicle motor driven generator and the respective one of said plurality of indicating lamps constitutes a charging indicating lamp, said relay coil connected in parallel with said charging indicating lamp, and said normally open switch connected in series with said diodes and said normally closed switch.

4. In a motor vehicle having an indicating lamp circuit according to claim 1, further comprising a relay comprised of a normally closed relay switch connected in series between said diodes and said normally closed switch, and a coil energized by the voltage at the neutral voltage node of a polyphase alternating generator to open said relay switch.

5. In a motor vehicle having a polyphase alternating current generator including a neutral voltage node; and having an indicating lamp circuit of the type including a plurality of switches responsive to motor vehicle operating conditions, a plurality of indicating lamps each connected in series with a respective switch of said plurality of switches, an electrical power source having a pair of terminals, a vehicle ignition switch connected between one terminal of said power source and each of said indicating lamps; means defining an electrically conductive path between the other terminal of said power source and each of said switches, and means for automatically simultaneously energizing said indicating lamps to permit detection of faulty indicating lamps, wherein said means for simultaneously energizing said indicating lamps comprises:

a relay switch including a coil connected between the neutral voltage node of said current generator and said means defining an electrically conductive path, a set of normally closed switch contacts and operable to open in response to energization of said coil, one of said switch contacts connected to said means defining an electrically conductive path; and a plurality of diodes each connected between the junction of a respective one of said switches with the respective one of said indicating lamps and the other of said switch contacts, said diodes having a polarity effective to complete a conductive circuit path between the terminals of said power source defined by said ignition switch, said indicating lamps, said diodes, said normally closed pair of switch contacts, and said means defining an electrically conductive path;

whereby said indicating lamps are automatically simultaneously energized and fault-free ones of said indicating lamps are illuminated to indicate their fault-free condition when said ignition switch is closed and said coil is de-energized due to inoperation of the vehicle motor.

6. In a motor vehicle indicating lamp circuit according to claim 5, further comprising:

a normally closed switch responsive to the motor vehicle motor oil pressure and opened when the motor oil pressure exceeds a certain value; and means electrically connecting said normally closed switch in series with said normally closed switch contacts, whereby opening or closure of said normally closed switch is effective to respectively disable or enable said relay switch from controlling energization of said lamps.

7. An indicating lamp circuit comprising: a plurality of indicating lamps; a plurality of switches, wherein each switch of said plurality of switches is operable to open and closed conditions; means electrically connecting each switch of said plurality of switches in series with a respective one of said lamps, whereby operation of ones of said switches between the open and closed conditions is effective to control the electrical energization of the respective ones of said lamps, and wherein one of said switches constitutes a lamp-checking switch; means for applying a voltage to the plurality of series combinations of ones of said switches with the respective ones of said lamps to electrically energize the lamps according to the settings of said plurality of switches; a plurality of diodes, each diode of said plurality of diodes connected between the junction of said lamp-checking switch and its respective lamp and the junction of a respective one of the remainder of the switches with its respective lamp, said diodes having a polarity with respect to said applied voltage effective to complete electrically conductive paths defined through said lamps, said diodes, and said lamp-checking switch, whereby closure of said lamp-checking switch is effective to apply said voltage to all of said lamps and energize said lamps whereby fault-free ones of said lamps are illuminated to indicate the fault-free condition; and a relay comprised of a relay coil and a normally open relay switch actuatable to close upon energization of said relay coil; wherein said relay switch is connected in series with said diodes and in the normally open condition prevents the completion of electrically conductive paths defined through said lamps, said diodes, said relay switch, and said lamp-checking switch to prevent energization of said lamps upon closure of said lamp-checking switch; and wherein the relay coil is connected in parallel with one of said lamps whereby closure of the respective switch corresponding to said one of said lamps is effective to energize said one of said lamps and said relay coil connected in parallel therewith to close said relay switch and thereby render said lamp-checking switch effective to control the energization of said lamps.

8. An indicating lamp circuit, for use with a power source including a polyphase alternating current generator having a neutral voltage node, comprising:
a plurality of indicating lamps;
a plurality of switches, wherein each switch of said plurality of switches is operable to open and closed conditions;
means electrically connecting each switch of said plurality of switches in series with a respective one of said lamps, whereby operation of ones of said switches between the open and closed conditions is effective to control the electrical energization of the respective ones of said lamps;
means for applying the voltage developed by said power source to the plurality of series combinations of ones of said switches with the respective ones of said lamps to electrically energize the lamps according to the settings of said plurality of switches;
a relay comprised of a relay coil and a normally closed relay switch actuatable to open upon energization of said relay coil, wherein said relay coil is connected to the neutral voltage node of said three-phase alternator to effect energization of said relay coil and opening of said relay switch upon operation of said alternator;
a plurality of diodes, each diode of said plurality of diodes connected between said relay switch and the junction of a respective one of said switches with its respective lamp, said diodes having a polarity effective to complete electrical conductive paths defined through said lamps, said diodes, and said relays switch; and
means electrically connecting the combination of said relay switch and said diodes in parallel with said switches, whereby closure of said relay switch upon de-energization of said relay coil is effective to apply said voltage to all of said lamps and energize said lamps whereby fault-free ones of said lamps are illuminated to indicate the fault-free condition.

9. An indicating lamp circuit according to claim 8, further comprising: a lamp-checking switch and a respective lamp connected in series with said lamp-checking switch; wherein said means for applying the voltage developed by said power source is effective to apply the voltage to the series combination of said lamp-checking switch and its respective lamp; and wherein said means electrically connecting the combination of said relay switch and said diodes in parallel with said switches connects said lamp-checking switch in series with said relay switch, whereby opening or closure of said lamp-checking switch is effective to respectively enable or prevent energization of said lamps upon closure of said relay switch.

* * * * *